United States Patent
Iguchi et al.

(10) Patent No.: US 11,206,436 B2
(45) Date of Patent: Dec. 21, 2021

(54) TRANSMITTING METHOD OF TRANSMITTING HIERARCHICALLY ENCODED DATA

(71) Applicant: Panasonic Intellectual Property Corporation of America, Torrance, CA (US)

(72) Inventors: Noritaka Iguchi, Osaka (JP); Tadamasa Toma, Osaka (JP); Takahiro Nishi, Nara (JP); Hisaya Katou, Kyoto (JP)

(73) Assignee: SUN PATENT TRUST, New York, NY (US)

( * ) Notice: Subject to any disclaimer, the term of this patent is extended or adjusted under 35 U.S.C. 154(b) by 447 days.

(21) Appl. No.: 14/941,583

(22) Filed: Nov. 14, 2015

(65) Prior Publication Data

US 2016/0073118 A1 Mar. 10, 2016

Related U.S. Application Data

(63) Continuation of application No. PCT/JP2014/003192, filed on Jun. 16, 2014.
(Continued)

(30) Foreign Application Priority Data

Jun. 4, 2014 (JP) .............................. JP2014-116046

(51) Int. Cl.
*H04N 21/236* (2011.01)
*H04N 21/6332* (2011.01)
*H04N 21/854* (2011.01)

(52) U.S. Cl.
CPC ....... *H04N 21/236* (2013.01); *H04N 21/6332* (2013.01); *H04N 21/85406* (2013.01)

(58) Field of Classification Search
None
See application file for complete search history.

(56) References Cited

U.S. PATENT DOCUMENTS

| 6,026,164 A | 2/2000 | Sakamoto et al. |
| 2009/0187960 A1 | 7/2009 | Lee et al. |

(Continued)

FOREIGN PATENT DOCUMENTS

| EP | 2 400 748 | 12/2011 |
| EP | 2 849 440 | 3/2015 |

(Continued)

OTHER PUBLICATIONS

Extended European Seach Report dated May 3, 2016 in related European Application No. 14813446.3.

(Continued)

*Primary Examiner* — Kaitlin A Retallick
(74) *Attorney, Agent, or Firm* — Wenderoth, Lind & Ponack, L.L.P.

(57) ABSTRACT

A transmitting method for transmitting encoded data obtained by hierarchically encoding a video image, includes: a generating step of generating an encoded stream including a packet which is obtained by packetizing the encoded data and to which at least a different packet ID has been allocated according to a layer level of the encoded data, and information indicating an association relationship between the packet ID and the layer level; and a transmitting step of transmitting the generated encoded stream, and the generated information indicating the association relationship. Thus, there is provided the encoded data transmitting method which allows a reception side to easily select encoded data which is hierarchically encoded.

9 Claims, 14 Drawing Sheets

Related U.S. Application Data

(60) Provisional application No. 61/836,179, filed on Jun. 18, 2013.

(56) References Cited

U.S. PATENT DOCUMENTS

| | | | | |
|---|---|---|---|---|
| 2010/0161716 A1* | 6/2010 | Kajos | ............... | H04N 21/2662 709/203 |
| 2010/0266052 A1* | 10/2010 | Kim | ............... | H04N 21/8547 375/240.28 |
| 2010/0272190 A1* | 10/2010 | Kim | ............... | H04N 21/4382 375/240.26 |
| 2011/0064146 A1* | 3/2011 | Chen | ............... | H04N 19/61 375/240.26 |
| 2011/0164683 A1* | 7/2011 | Takahashi | ............... | H04N 19/70 375/240.16 |
| 2012/0023254 A1* | 1/2012 | Park | ............... | H04L 47/30 709/231 |
| 2012/0099656 A1 | 4/2012 | Ohya et al. | | |
| 2012/0183077 A1 | 7/2012 | Hong et al. | | |
| 2012/0269207 A1 | 10/2012 | Jang et al. | | |
| 2012/0320168 A1* | 12/2012 | Yun | ............... | H04N 21/4345 348/51 |
| 2013/0097627 A1* | 4/2013 | Hwang | ............... | H04H 60/73 725/25 |
| 2013/0136193 A1* | 5/2013 | Hwang | ............... | H04L 65/80 375/240.27 |
| 2013/0279879 A1* | 10/2013 | Watanabe | ............... | H04N 21/8543 386/239 |
| 2014/0092964 A1* | 4/2014 | Ugur | ............... | H04N 19/105 375/240.12 |
| 2014/0137168 A1* | 5/2014 | Takahashi | ............... | H04N 21/2383 725/90 |
| 2015/0089560 A1* | 3/2015 | Park | ............... | H04L 65/607 725/116 |

FOREIGN PATENT DOCUMENTS

| | | | |
|---|---|---|---|
| JP | 8-331543 | 12/1996 | |
| JP | 2012-095053 | 5/2012 | |
| WO | 2008/156325 | 12/2008 | |
| WO | WO-2008156325 A2 * | 12/2008 | ............ H04N 19/39 |
| WO | 2009/025189 | 2/2009 | |

OTHER PUBLICATIONS

International Search Report of PCT application No. PCT/JP2014/003192 dated Sep. 16, 2014.

"Information technology—High efficiency coding and media delivery in heterogeneous environments—Part1:MPEG media transport(MMT)" ISO/IEC FDIS 23008-1, 2013.

Office Action dated Jan. 29, 2019 in European Patent Application No. 14813446.3.

Schierl T et al.: "Scalable video coding over RTP and MPEG-2 transport stream in broadcast and IPTV channels", Technical Report of Wireless Networking Group, Coordinated Science Laboratory; Dept. Electrical and Computer Engineering; University of Illinois at Urbana-Champaign, US, vol. 16, No. 5, Oct. 1, 2009 (Oct. 1, 2009), pp. 64-71, XP011284069, ISSN: 1536-1284, DOI: 10.1109/MWC.2009.5300304.

* cited by examiner

| PACKET ID | DATA (ASSET) |
|---|---|
| 1 | VIDEO DATA OF BASE LAYER |
| 2 | VIDEO DATA OF ENHACEMAENT LAYER |
| 3 | AUDIO DATA |
| 4 | TIME OFFSET INFORMATION |
| 5 | PROGRAM INFORMATION |

TRANSMITTING METHOD OF TRANSMITTING HIERARCHICALLY ENCODED DATA

BACKGROUND

1. Technical Field

The present disclosure relates to a transmitting method for transmitting encoded data which is hierarchically encoded.

2. Description of the Related Art

Conventionally, a technique of transmitting encoded data according to predetermined multiplexing methods is known. The encoded data is generated by encoding content including video data and audio data based on moving image coding standards such as HEVC (High Efficiency Video Coding).

Predetermined transmission methods include, for example, MPEG-2 TS (Moving Picture Experts Group-2 Transport Stream) and MMT (MPEG Media Transport) (see Non-Patent Literature 1).

HEVC enables hierarchical coding. A reception side can select a frame rate of a video image by selecting encoded data which is hierarchically encoded, according to a layer level.

CITATION LIST

Non-Patent Literature

NPL 1: Information technology—High efficiency coding and media delivery in heterogeneous environment—Part1: MPEG media transport (MMT), ISO/IEC DIS 23008-1

SUMMARY

In one general aspect, the techniques disclosed here feature a transmitting method for transmitting encoded data obtained by hierarchically encoding a video image, the transmitting method including: a generating step of generating an encoded stream including a packet which is obtained by packetizing the encoded data and to which at least a different packet ID has been allocated according to a layer level of the encoded data, and information indicating an association relationship between the packet ID and the layer level; and a transmitting step of transmitting the generated encoded stream, and the generated information indicating the association relationship.

In addition, these comprehensive or specific aspects may be realized by a system, a device, an integrated circuit, a computer program or a recording medium such as a computer-readable CD-ROM. Further, these comprehensive or specific aspects may be realized by an arbitrary combination of the system, the device, the integrated circuit, the computer program and the recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

DETAILED DESCRIPTION (Base Knowledge of Present Disclosure)

Figure 1:
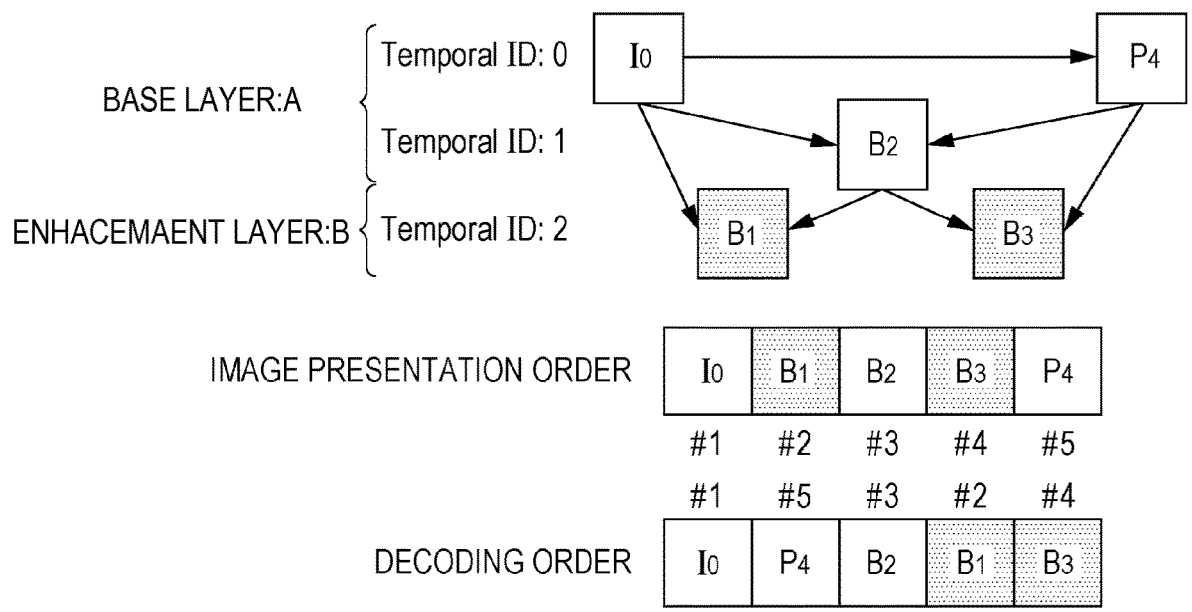
FIG. 1 is a view for explaining encoded data subjected to temporal scalable coding.

A video coding method, HEVC (High Efficiency Video Coding), supports temporal scalable coding, and can reproduce a video image of 120 fps as a video image of 60 fps. FIG. 1 is a view for explaining encoded data subjected to temporal scalable coding.

A Temporal ID is allocated to encoded data subjected to temporal scalable coding, per layer. In FIG. 1, by displaying pictures (I0 and P4) whose Temporal IDs are 0 and picture (B2) whose Temporal ID is 1, it is possible to display a video image at 60 fps, and, by additionally displaying pictures (B1 and B3) whose Temporal IDs are 2, it is possible to display a video image at 120 fps.

In an example in FIG. 1, encoded data whose Temporal ID is 0 or 1 is a base layer (base layer level) and encoded data whose Temporal ID is 2 is an enhancement layer (enhancement layer level).

Pictures of a base layer are independently decodable pictures or are decodable pictures by using the other pictures of the base layer. By contrast with this, pictures of the enhancement layer are not be independently decodable pictures, and are decodable pictures after reference pictures positioned at start points of arrows in FIG. 1 are decoded. Hence, pictures of the base layer which are the reference pictures for the pictures of the enhancement layer need to be decoded prior to the pictures of the enhancement layer.

In addition, a decoding order is different from an image presentation order. In the example in FIG. 1, while the image presentation order is (I0, B1, B2, B3 and P4), the decoding order is (I0, P4, B2, B1 and B3). The image presentation order is determined based on a PTS (Presentation Time Stamp) allocated per picture, and the decoding order is determined based on a DTS (Decode Time Stamp) allocated per picture.

Not only in the case of temporal scalable coding but also in the case of spatial scalable coding and SNR scalable coding, when pictures are classified into the base layer and the enhancement layer, the pictures belonging to the enhancement layer are not be independently decodable pictures. Pictures belonging to the enhancement layer need to be decoded together with the pictures belonging to the base layer.

Desirably, a reception side (decoding side) can easily select encoded data which is scalable-coded (hierarchically coded).

A transmitting method according to one aspect of the present disclosure is a transmitting method for transmitting encoded data obtained by hierarchically encoding a video image, and includes: a generating step of generating an encoded stream including a packet which is obtained by packetizing the encoded data and to which at least a different packet ID has been allocated according to a layer level of the encoded data, and information indicating an association relationship between the packet ID and the layer level; and a transmitting step of transmitting the generated encoded stream, and the generated information indicating the association relationship.

Consequently, it is possible to select encoded data per layer level by filtering a packet ID. That is, the reception side can easily select encoded data.

Further, the layer level may include a base layer level and an enhancement layer level, the encoded data of the base layer level may be able to be independently decoded or be able to be decoded by referring to decoded data of another encoded data of the base layer level, and the encoded data of the enhancement layer level may be able to be decoded by referring to decoded data of the encoded data of the base layer level.

Furthermore, the generating step may include generating a first encoded stream that is the encoded stream which includes the packet obtained by packetizing the encoded data of the base layer level and does not include the packet obtained by packetizing the encoded data of the enhancement layer level, and generating a second encoded stream that is the encoded stream which includes the packet obtained by packetizing the encoded data of the enhancement layer level and does not include the packet obtained by packetizing the encoded data of the base layer level, and the transmitting step may include transmitting the first encoded stream by using a first channel, and transmitting the second encoded stream by using a second channel different from the first channel.

Still further, the generating step may include generating the first encoded stream and the second encoded stream according to different multiplexing methods.

Moreover, the generating step may include generating one of the first encoded stream and the second encoded stream according to MPEG-2 TS (Moving Picture Experts Group-2 Transport Stream), and generating the other one of the first encoded stream and the second encoded stream according to MMT (MPEG Media Transport).

Further, one of the first channel and the second channel may be a channel for broadcasting, and the other one of the first channel and the second channel may be a channel used for communication.

Furthermore, the generating step may include generating the encoded stream including the information indicating the association relationship, and the transmitting step may include transmitting the encoded stream including the information indicating the association relationship.

Still further, the information indicating the association relationship may include one of information indicating that the encoded stream is individually decodable stream and information indicating another encoded stream which is necessary to decode the encoded stream.

In addition, these comprehensive or specific aspects may be realized by a system, a device, an integrated circuit, a computer program or a recording medium such as a computer-readable CD-ROM. Further, these comprehensive or specific aspects may be realized by an arbitrary combination of the system, the device, the integrated circuit, the computer program and the recording medium.

The exemplary embodiments will be described below with reference to the drawings.

In addition, each of the exemplary embodiments described below is a comprehensive or specific example of the present disclosure. Numerical values, shapes, materials, components, arrangement positions and connection modes of the components, steps and an order of the steps described in following exemplary embodiments are exemplary, and do not intend to limit the present disclosure. Further, components which are not recited in an independent claim which represents a top concept among the components in the following exemplary embodiments will be described as arbitrary components.

First Exemplary Embodiment

[Transmitting Method]

The transmitting method (transmitting device) according to the first exemplary embodiment will be described below. The transmitting method for transmitting encoded data according to MMT will be described as an example in the first exemplary embodiment.

Figure 2:
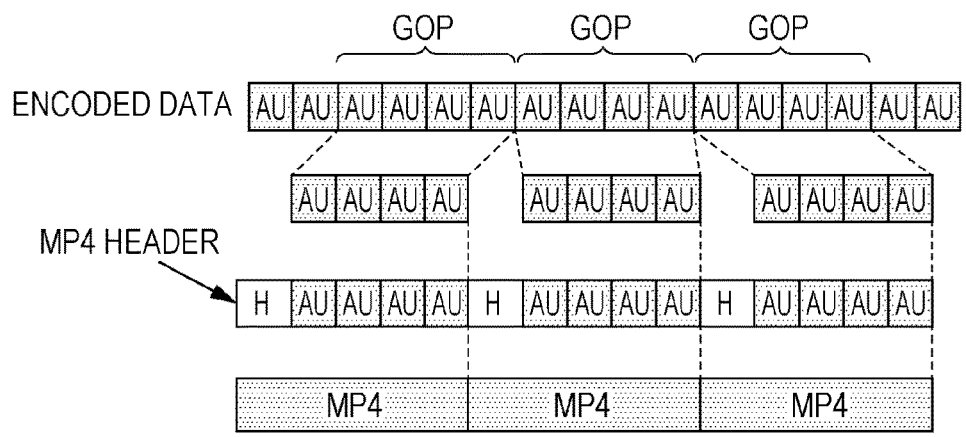
FIG. 2 is a first view for explaining a data structure of an encoded stream according to MMT.
Figure 3:
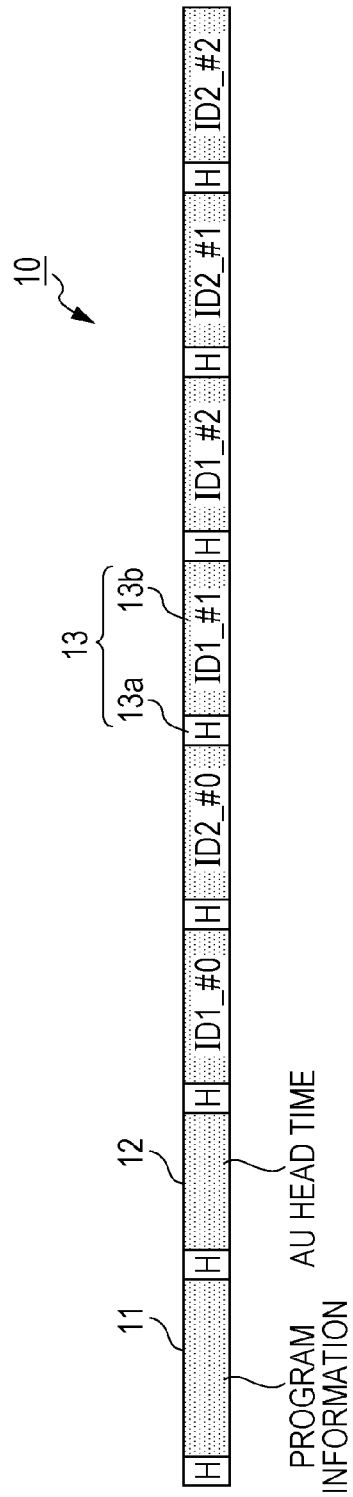
FIG. 3 is a second view for explaining a data structure of an encoded stream according to MMT.

First, a data structure of an encoded stream according to MMT will be described. FIGS. 2 and 3 are views for explaining data structures of encoded streams according to MMT.

As illustrated in FIG. 2, encoded data includes a plurality of access units (AU). Encoded data is, for example, AV data encoded based on moving image coding standards such as HEVC. More specifically, encoded data includes video data, audio data, meta data accompanying the video data and the audio data, still images, and files. When encoded data is video data, one AU is a unit corresponding to one picture (one frame).

According to MMT, encoded data is converted into MP4 data (the encoded data is allocated to an MP4 header) according to an MP4 file format in GOP (Group Of Picture) units. In the MP4 header included in the MP4 data, relative values of a presentation time (the above PTS) and a decoding time (the above DTS) of an AU are described. Further, in the MP4 header, sequence numbers of the MP4 data are described. In addition, the MP4 data (MP4 file) is an example of an MPU (Media Processing Unit) which is a data unit defined according to the MMT standards.

In addition, a case where MP4 data (file) is transmitted will be described below as an example, and data to be transmitted may not be MP4 data. For example, data may be data of a file format different from a file format of an MP4 file. As long as encoded data and information (e.g. information included in an MP4 header) which is necessary to decode the encoded data are transmitted, the reception side can decode the encoded data.

Further, as illustrated in FIG. 3, encoded stream 10 according to MMT includes program information 11, time offset information 12 and a plurality of MMT packets 13. In other words, encoded stream 10 is a packet sequence of MMT packets 13.

Encoded stream 10 (MMT stream) is one of one or more streams which configure one MMT package. The MMT package corresponds to, for example, one broadcast program content.

Program information 11 includes information indicating that encoded stream 10 is a scalable-coded stream (a stream including both of a base layer and an enhancement layer), and information of a type of scalable coding and a number of layer levels (a number of layers). In this regard, the type of scalable coding is temporal scalability, spatial scalability and SNR (Signal-to-Noise Ratio) scalability, and the number of layer levels refers to the number of layers such as the base layer and the enhancement layer. In addition, program information 11 does not need to include all pieces of the above information, and needs to include only at least one of pieces of information.

Further, program information 11 includes, for example, information indicating an association relationship between a plurality of assets and packet IDs. In addition, each asset is a data entity including data of same transport characteristics, and is, for example, one of video data and audio data. Further, program information 11 may include a descriptor which indicates a layer relationship between packet IDs (assets).

Program information 11 is, more specifically, CI (Composition Information) and an MPT (MMT Package Table) according to MMT. In addition, program information 11 is a PMT (Program Map Table) according to MPEG2-TS, and is MPD (Media Presentation Description) according to MPEG-DASH.

Time offset information 12 is time information used to determine a PTS or a DTS of each AU. More specifically, time offset information 12 is, for example, an absolute PTS or DTS of a head AU belonging to the base layer.

MMT packet 13 is data obtained by packetizing MP4 data. According to the first exemplary embodiment, one MMT packet 13 includes one MP4 data (MPU). As illustrated in FIG. 3, MMT packet 13 includes header 13a (an MMT packet header or a TS packet header in the case of MPEG2-TS) and payload 13b.

In payload 13b, MP4 data is stored. In addition, in payload 13b, divided MP4 is stored in some cases.

Header 13a is auxiliary information related to payload 13b. For example, header 13a includes a packet ID.

The packet ID is an identification number indicating an asset of data included in MMT packet 13 (payload 13b). The packet ID is a unique identification number of each asset which configures an MMT package.

Figures 4, 5:
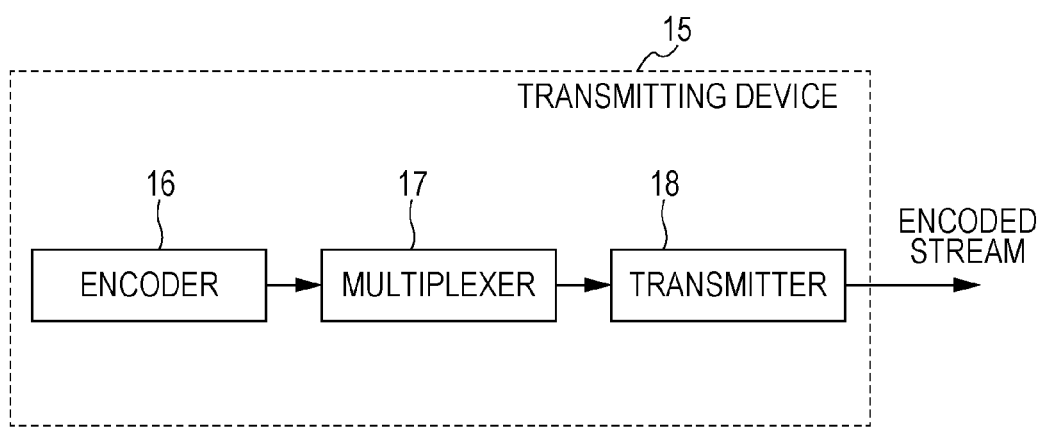
FIG. 4 is a view illustrating an association relationship of packet IDs of an encoded stream and items of data (assets) according to a first exemplary embodiment.
FIG. 5 is a block diagram illustrating a configuration of a transmitting device according to the first exemplary embodiment.

Features of encoded stream 10 include that video data of the base layer and video data of the enhancement layer are handled as different assets. That is, a different packet ID is allocated to MMT packet 13 of encoded stream 10 according to a layer level of encoded data to be stored. FIG. 4 is a view illustrating an association relationship of packet IDs of encoded stream 10 and items of data (assets). In addition, FIG. 4 illustrates an example of the association relationship.

As illustrated in FIG. 4, in the first exemplary embodiment, packet ID "1" is allocated to MMT packet 13 obtained by packetizing video data of the base layer (encoded data of the base layer level). That is, packet ID "1" is described in header 13a. Further, packet ID "2" is allocated to MMT packet 13 obtained by packetizing video data of the enhancement layer (encoded data of the enhancement layer level). That is, packet ID "2" is described in header 13a.

Similarly, packet ID "3" is allocated to MMT packet 13 obtained by packetizing audio data, and packet ID "4" is allocated to MMT packet 13 obtained by packetizing time offset information 12. Packet ID "5" is allocated to MMT packet 13 obtained by packetizing program information 11.

Further, the association relationship illustrated in FIG. 4 is described in program information 11 of encoded stream 10. In addition, the association relationship includes information indicating that MMT packet 13 to which packet ID "1" has been allocated and MMT packet 13 to which packet ID "2" has been allocated forms a pair, and these MMT packets 13 are used for scalability.

Figure 6:
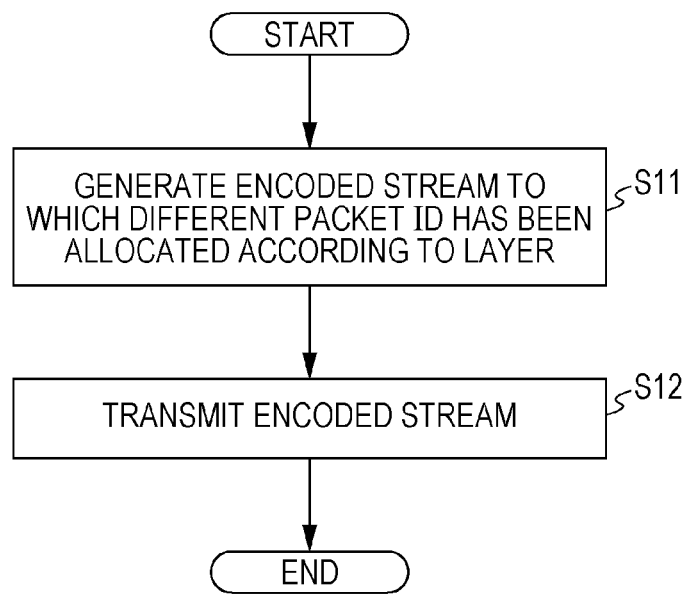
FIG. 6 is a flowchart of a transmitting method according to the first exemplary embodiment.

The transmitting method (transmitting device) for transmitting encoded stream 10 according to the first exemplary embodiment described above will be described above. FIG. 5 is a block diagram illustrating a configuration of the transmitting device according to the first exemplary embodiment. FIG. 6 is a flowchart of the transmitting method according to the first exemplary embodiment.

As illustrated in FIG. 5, transmitting device 15 includes encoder 16, multiplexer 17 and transmitter 18. In addition, more specifically, components of transmitting device 15 are realized by a microcomputer, a processor or a dedicated circuit.

According to the transmitting method for transmitting encoded stream 10 according to the first exemplary embodiment, encoded stream 10 including MMT packets 13 to which packet IDs have been allocated, and information indicating an association relationship between packet IDs and layer levels is generated (S11).

More specifically, multiplexer 17 determines (selects) packet IDs according to layer levels of the encoded data when the encoded data output from encoder 16 is packetized. Next, multiplexer 17 generates MMT packets 13 including the determined packet IDs. Meanwhile, multiplexer 17 generates information indicating the association relationship. Further, multiplexer 17 generates encoded stream 10 including generated MMT packets 13 and the generated association relationship.

Generated encoded stream 10 is transmitted by transmitter 18 by using a channel (S12).

Thus, when encoded stream 10 including MMT packets 13 to which different packet IDs have been allocated according to the layer levels of the encoded data are transmitted, the reception side can easily select encoded data by using a mechanism of a conventional packet filter.

In addition, the information indicating the association relationship between the packet IDs and the layer levels may be separately transmitted from encoded stream 10 without being included in encoded stream 10. Further, when the reception side already grasps the association relationship between the packet IDs and the layer levels, the information indicating the packet IDs and the layer levels may not be transmitted.

For example, the information indicating the association relationship may be included in program information repeatedly inserted in continuous signals such as broadcast signals, or may be obtained from a communication server before decoding starts.

[Receiving Method]

Figure 7:
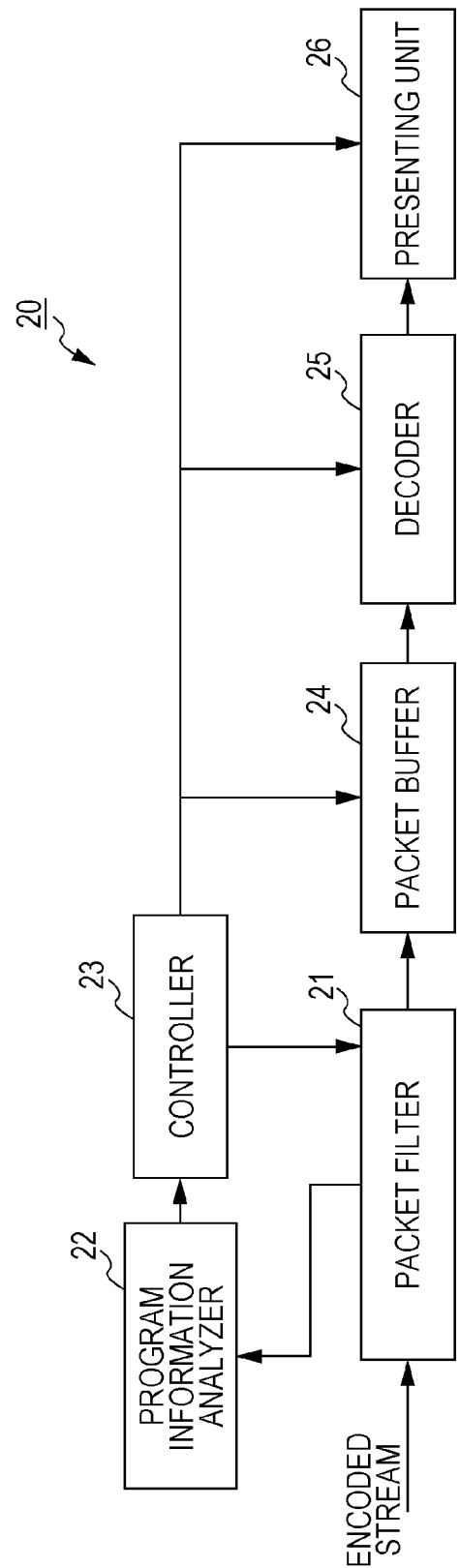
FIG. 7 is a block diagram illustrating a configuration of a receiving device according to the first exemplary embodiment.
Figure 8:
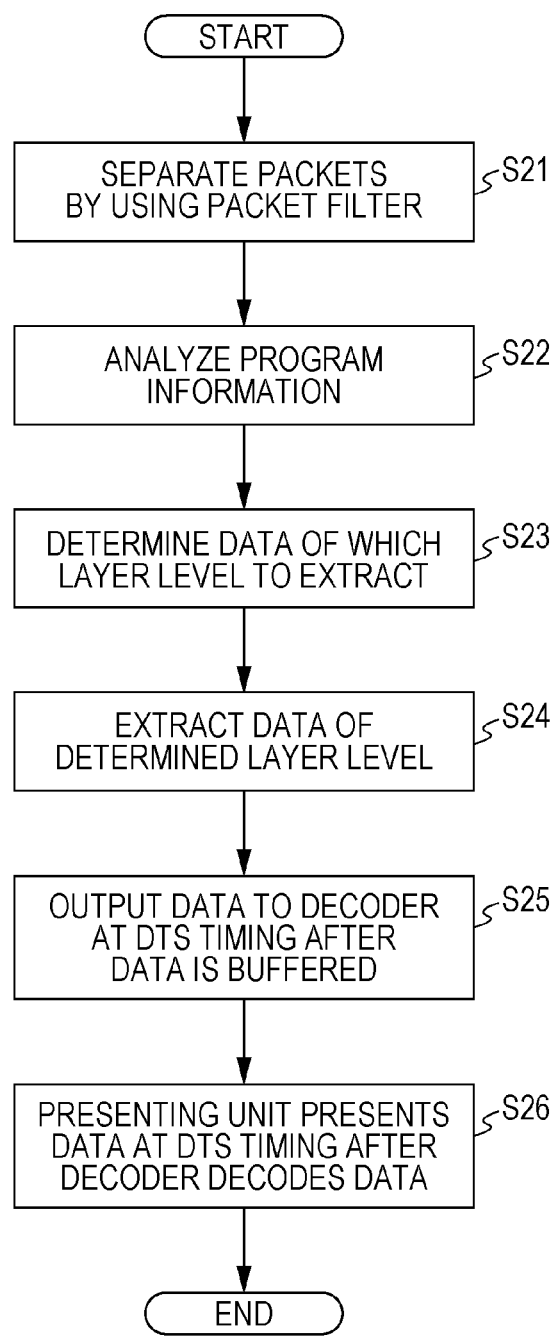
FIG. 8 is a flowchart of a receiving method according to the first exemplary embodiment.

The receiving method (receiving device) according to the first exemplary embodiment will be described below. FIG. 7 is a block diagram illustrating a configuration of the receiving device according to the first exemplary embodiment. FIG. 8 is a flowchart of the receiving method according to the first exemplary embodiment.

In addition, hereinafter, the base layer will be referred to as layer level A, and the enhancement layer will be referred to as layer level B.

As illustrated in FIG. 7, receiving device 20 includes packet filter 21, program information analyzer 22, controller 23, packet buffer 24, decoder 25 and presenting unit 26. In addition, more specifically, components other than packet buffer 24 and presenting unit 26 among components of receiving device 20 are realized by a microcomputer, a processor or a dedicated circuit. Packet buffer 24 is, for example, a storage device such as a semiconductor memory. Presenting unit 26 is, for example, a display device such as a liquid crystal panel.

As illustrated in FIG. 8, packet filter 21 first separates MMT packets 13 included in encoded stream 10 (S21), and outputs program information 11 to program information analyzer 22. In this regard, packet filter 21 recognizes the packet ID of MMT packet 13 including program information 11 in advance (packet filter 21 can obtain the packet ID of MMT packet 13 including program information 11 from another control information), and, consequently, can separate MMT packets 13 including program information 11, from encoded stream 10.

Next, program information analyzer 22 analyzes program information 11 (S22). Program information 11 includes an association between packet IDs and assets.

Meanwhile, controller 23 determines encoded data of which layer level (MMT packet 13) to extract (S23). This determination may be performed based on a user's input received by an input receiver (not illustrated in FIG. 7) or may be performed according to a specification of presenting unit 26 (e.g. a frame rate supported by presenting unit 26).

Further, packet filter 21 extracts (filters) encoded data (MMT packet 13) of the determined layer level under control of controller 23 (S24). Controller 23 recognizes the packet ID per layer level based on the analysis of program information analyzer 22, and, consequently, can cause packet filter 21 to extract the encoded data of the determined layer level.

Next, packet buffer 24 buffers the encoded data extracted by packet filter 21, and outputs the encoded data to decoder 25 at a DTS timing (S25). The DTS timing is calculated based on program information 11, time offset information 12 and time information transmitted in, for example, an MP4 header. In addition, when the same DTS is allocated to encoded data of the base layer and encoded data of the enhancement layer by spatial scalability, the decoding order may be rearranged to decode the encoded data of the base layer prior to the encoded data of the enhancement layer.

The encoded data buffered by packet buffer 24 is decoded by decoder 25, and is presented (displayed) at a PTS timing by presenting unit 26 (S26). The PTS timing is calculated based on program information 11, time offset information 12, and time information in an MP4 header.

Figure 9:
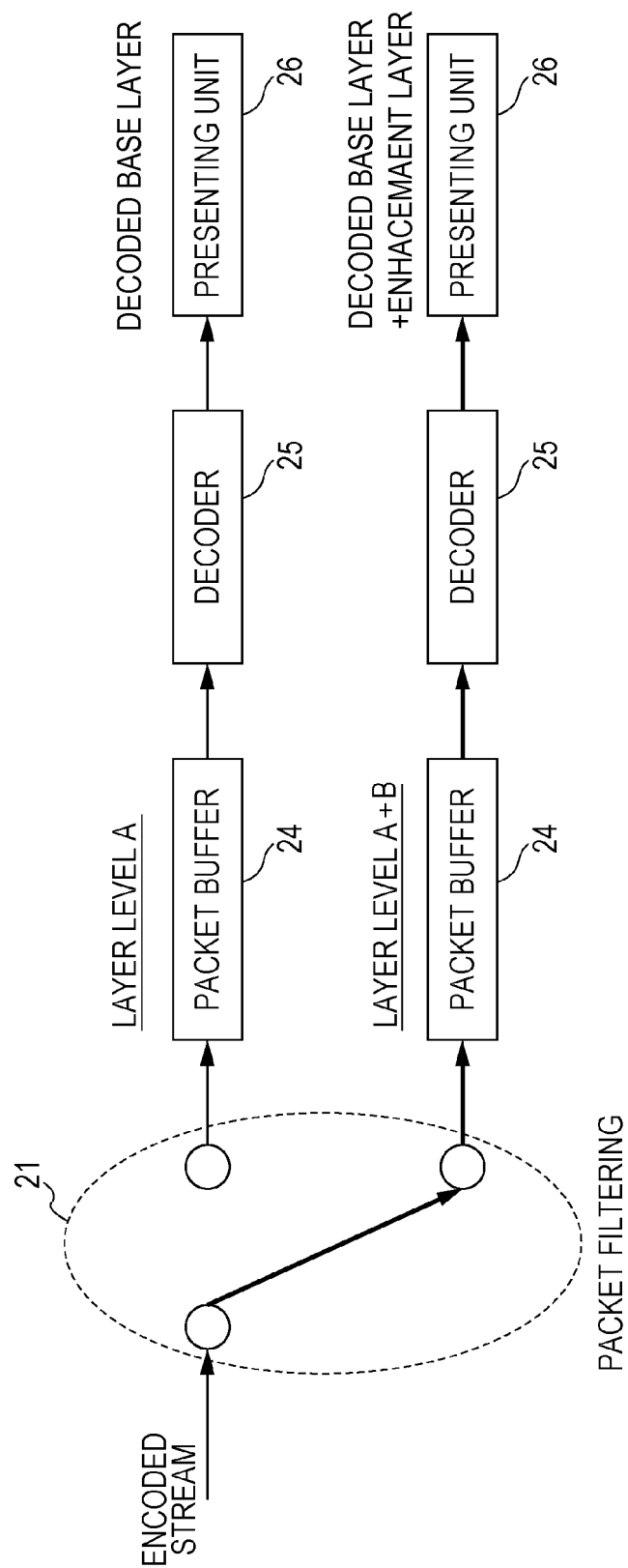
FIG. 9 is a view conceptually illustrating the receiving method according to the first exemplary embodiment.

This receiving method will be further described with reference to FIG. 9. FIG. 9 is a view conceptually illustrating the receiving method according to the first exemplary embodiment.

As illustrated in FIG. 9, when, for example, the layer level is determined as layer level A (an extraction target is only encoded data of the base layer), packet filter 21 extracts all MMT packets 13 to which packet IDs "1" have been allocated, and does not extract MMT packets 13 to which packet IDs "2" have been allocated. As a result, presenting unit 26 displays a video image of a low frame rate (e.g. 60 fps).

Further, when, for example, the layer level is determined as layer levels A+B (extraction targets are both encoded data of the base layer and encoded data of the enhancement layer), packet filter 21 extracts all MMT packets 13 to which packet IDs "1" or "2" have been allocated. As a result, presenting unit 26 displays a video image of a high frame rate (e.g. 120 fps).

Thus, receiving device 20 can easily select encoded data of the base layer level and encoded data of the enhancement layer level by using packet filter 21.

Second Exemplary Embodiment

[Transmitting and Receiving Methods]

Figure 10:
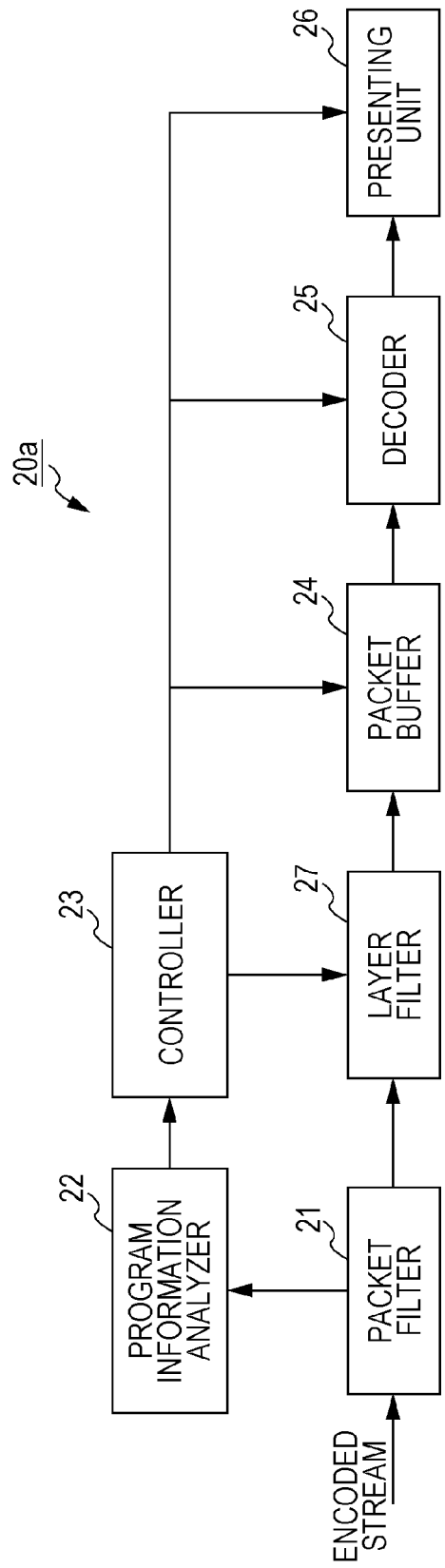
FIG. 10 is a block diagram illustrating a configuration of a receiving device according to a second exemplary embodiment.
Figure 11:
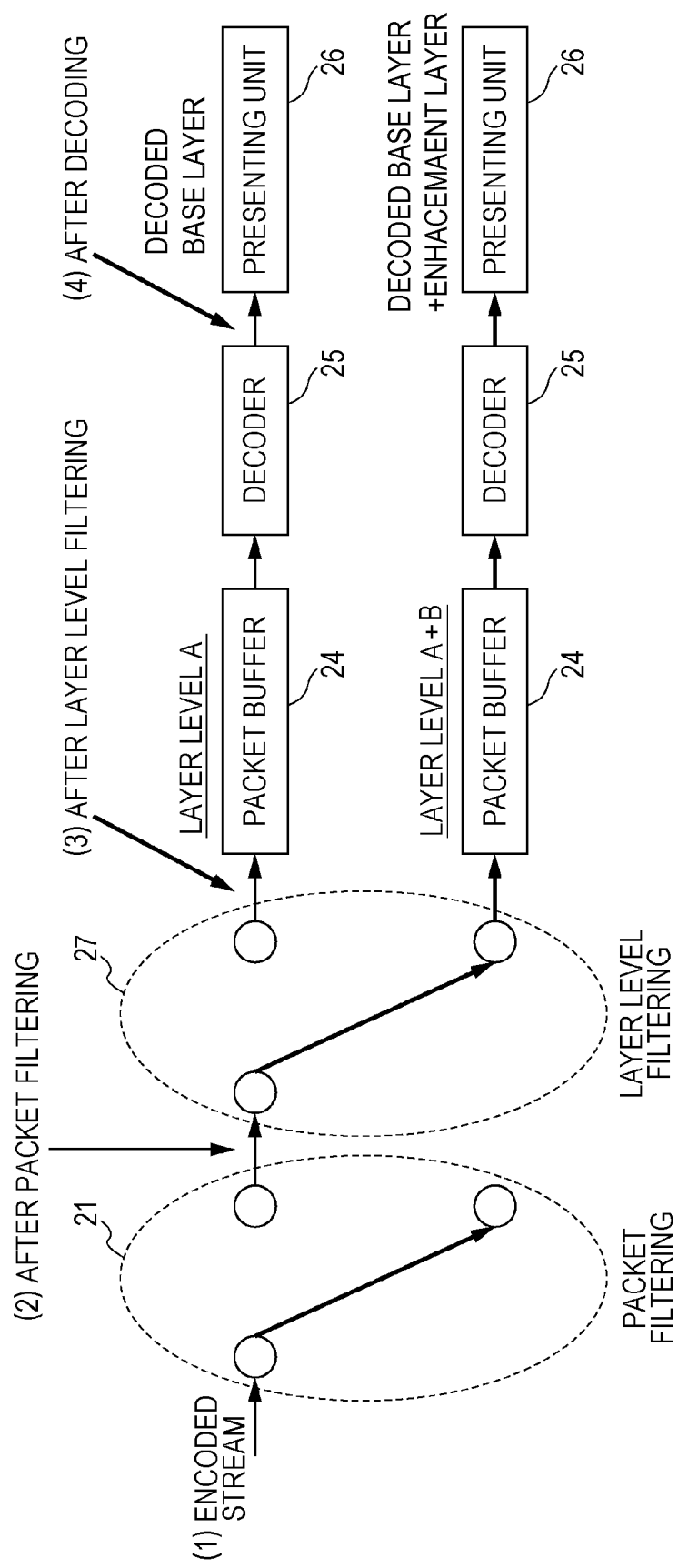
FIG. 11 is a first view for explaining an outline of transmitting and receiving methods according to the second exemplary embodiment.
Figure 12:
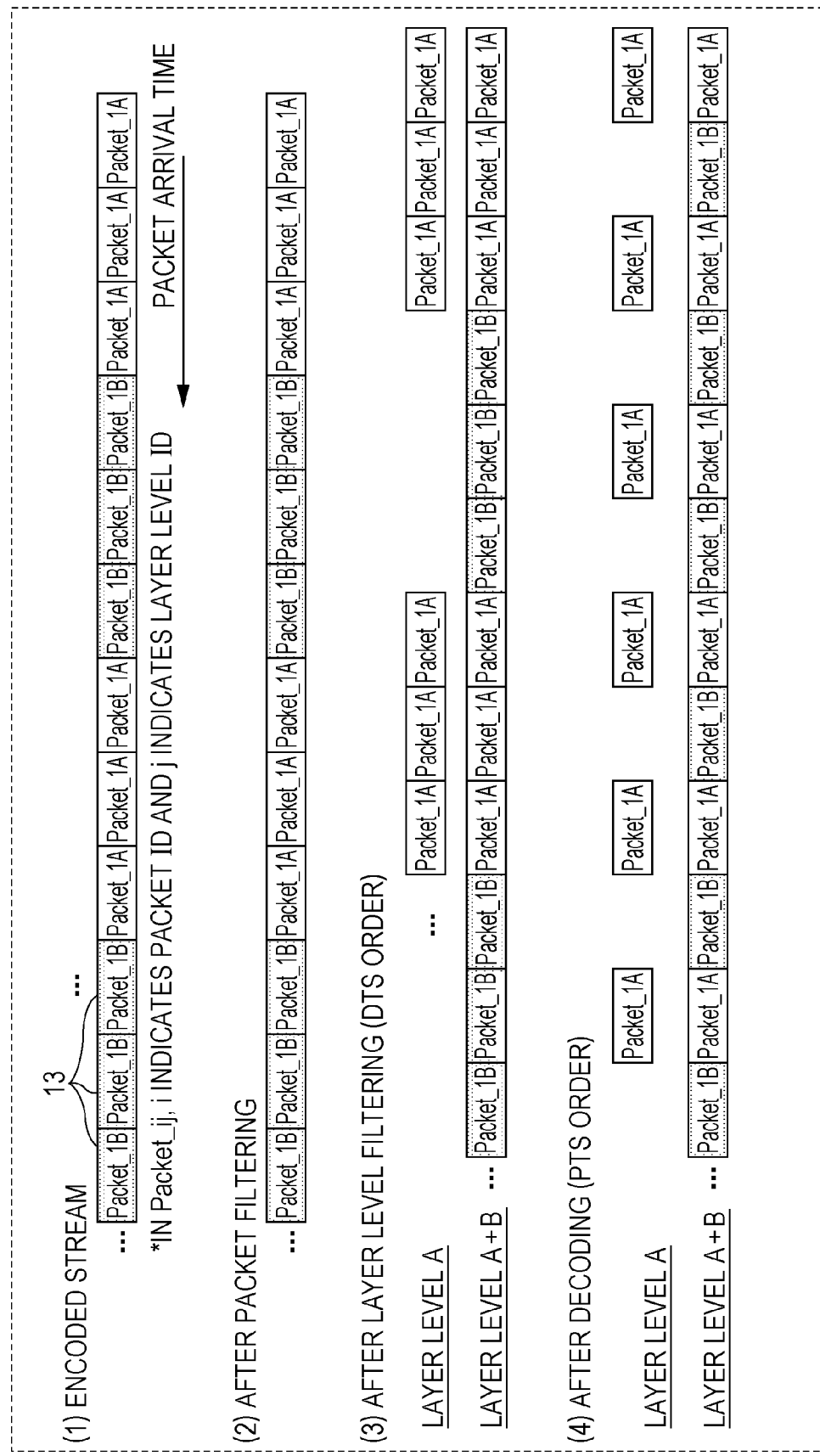
FIG. 12 is a second view for explaining the outline of the transmitting and receiving methods according to the second exemplary embodiment.

A transmitting method and a receiving method (receiving device) according to the second exemplary embodiment will be described below with reference to the drawings. FIG. 10 is a block diagram illustrating a configuration of the receiving device according to the second exemplary embodiment. FIGS. 11 and 12 are views for explaining the outline of the transmitting and receiving methods according to the second exemplary embodiment. In addition, a block diagram of a transmitting device and a flowchart of the receiving method and the transmitting method are substantially the same as the block diagram and the flowchart described in the first exemplary embodiment except for that a layer level ID is used, and therefore will not be described.

As illustrated in FIG. 10, receiving device 20a according to the second exemplary embodiment differs from receiving device 20 in including layer filter 27.

As indicated by (1) in FIG. 11, in each encoded stream transmitted by the transmitting method according to the second exemplary embodiment, the same packet ID is allocated to each of MMT packets 13 of the base layer and MMT packets 13 of an enhancement layer.

Further, in addition to the packet ID, a layer level ID that is an identifier related to a layer level is allocated to MMT packets 13 to which the same packet ID has been allocated. In an example in FIG. 10, a layer level ID of layer level A is allocated to the base layer, and a layer level ID of layer level B is allocated to the enhancement layer. The packet ID and the layer level ID are described in, for example, header 13a (MTT packet header) corresponding to an MTT packet.

Each layer level ID may be defined as a new identifier, or may be realized by using private user data or another identifier.

In addition, when a TS packet header is used, each layer level ID may be defined as a new identifier or may be realized by using an existing identifier. By, for example, using one or both of a transport priority identifier and an elementary stream priority identifier, it is possible to realize a function equivalent to each layer level ID.

As indicated by (2) in FIG. 11 and (2) in FIG. 12, a transmitted encoded stream is packet-filtered by packet filter 21 of receiving device 20*a*. That is, the transmitted encoded stream is filtered based on a packet ID allocated to a packet header.

As indicated by (3) in FIG. 11 and (3) in FIG. 12, each packet-filtered MMT packet 13 is further subjected to layer level filtering based on a layer level ID by layer filter 27. Next, the filtered encoded data is buffered once by packet buffer 24, and then is decoded by decoder 25 at a DTS timing. Further, as indicated by (4) in FIG. 11 and (4) in FIG. 12, the decoded data is presented at a PTS timing by presenting unit 26.

In this regard, to obtain a video image obtained by decoding only the base layer (e.g. a video image at 60 fps), only MMT packets 13 (items of encoded data) of layer level ID "A" of a lower layer need to be decoded. Hence, upon layer level filtering, only MMT packets 13 of layer level ID "A" are extracted.

Meanwhile, to obtain a video image (e.g. a video image at 120 fps) obtained by decoding the base layer and the enhancement layer, both of MMT packets 13 of layer level ID "A" of the lower layer and MMT packets 13 of layer level ID "B" of a higher layer need to be decoded. Hence, upon layer level filtering, both MMT packets 13 of layer level ID "A" and MMT packets 13 of layer level ID "B" are extracted.

Thus, the receiving method (receiving device 20*a*) according to the second exemplary embodiment includes a sequence of filtering only MMT packets 13 of layer level ID "A" and decoding and presenting a video image of the base layer, and a sequence of filtering MMT packets 13 of layer level IDs "A" and "B" and decoding and presenting a video image of the base layer+the enhancement layer.

In addition, which packet ID or layer level ID is filtered upon packet filtering and layer level filtering is determined by taking into account a type of scalable coding described in program information 11, information of a number of layers, and encoded data of which layer is decoded and displayed by receiving device 20*a*.

This determination is performed by receiving device 20*a* according to, for example, processing capability of receiving device 20*a*. In addition, the transmitting device may transmit, as signaling information, information related to capability of receiving device 20*a* which is necessary to decode and display content. In this case, receiving device 20*a* performs the above determination by cross-checking the signaling information and capability of receiving device 20*a*.

In addition, a filter formed by integrating packet filter 21 and layer level filter 27 may be provided, and the filter may collectively perform filtering based on a packet ID and a layer level ID.

As described above, according to the transmitting and receiving methods according to the second exemplary embodiment, it is possible to select encoded data per layer level by filtering a layer level ID. That is, the reception side can easily select encoded data. Further, a packet ID and a layer level ID are separately allocated. Consequently, it is possible to handle encoded data of the base layer and encoded data of the enhancement layer as the same stream upon packet filtering.

Furthermore, by allocating a layer level ID to each packet, it is possible to extract encoded data of a desired layer by performing only a filtering operation, and it is not necessary to perform reassembly.

Still further, it is possible to extract encoded data of a desired layer by layer filtering and, consequently, the receiving device which supports decoding of only the base layer can reduce a memory which buffers data packets of the enhancement layer.

Specific Example 1

According to MMT, by fragmenting an MPU including MP4 data into MFUs (Media Fragment Unit), and adding header 13*a* in MFU units, it is possible to generate MMT packets 13. In this regard, each MFU can be fragmented into minimum NAL (Network Abstraction Layer) units.

Figure 13:
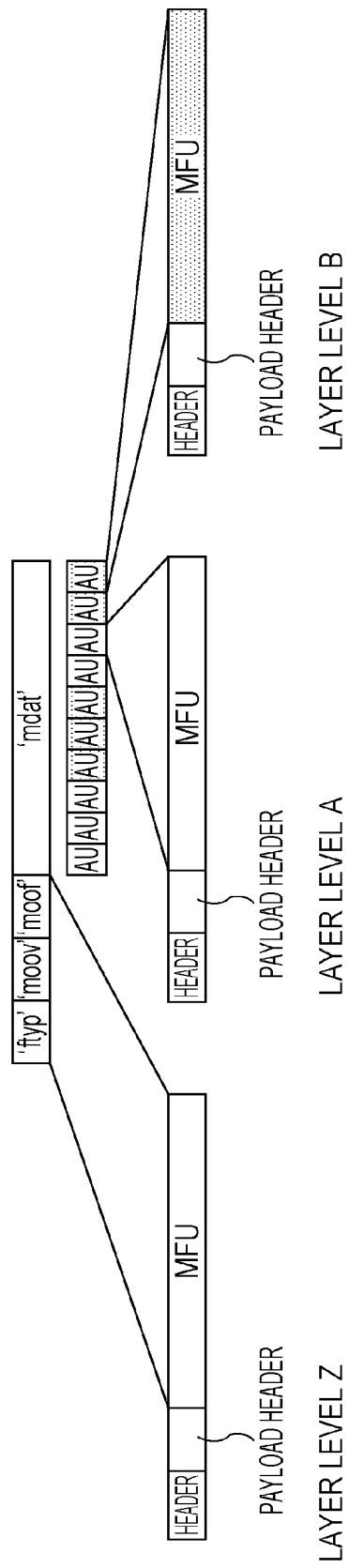
FIG. 13 is a first view for explaining an example where encoded data is packetized in fragmented MFU units.
Figure 14:
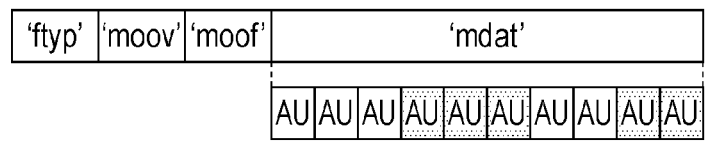
FIG. 14 is a second view for explaining an example where encoded data is packetized in fragmented MFU units.
Figure 15:
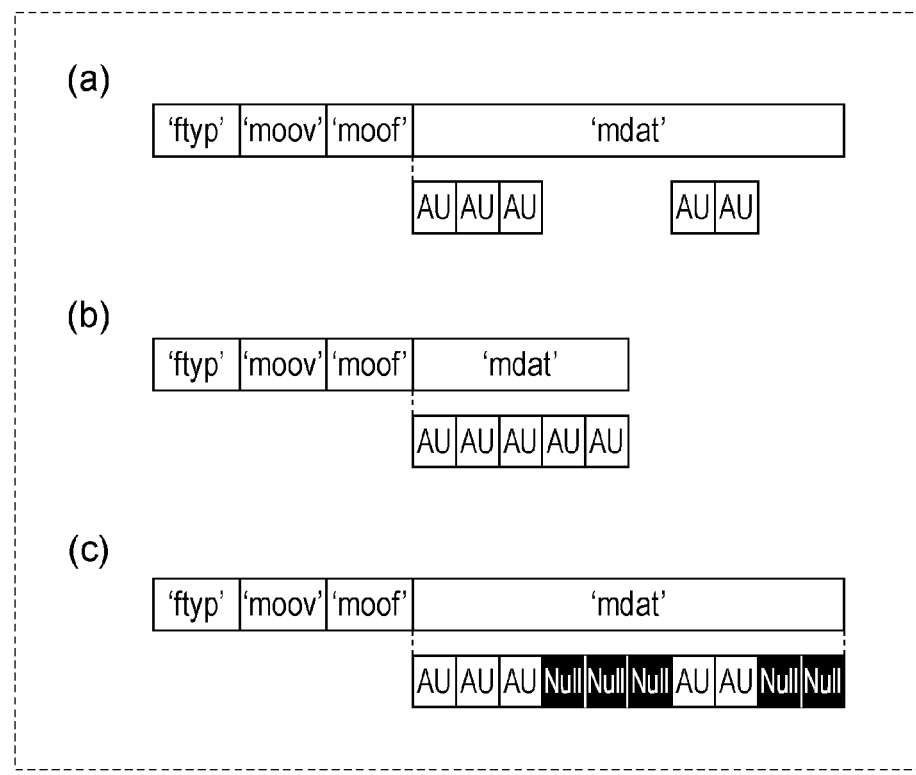
FIG. 15 is a third view for explaining an example where encoded data is packetized in fragmented MFU units.

An example where encoded data is packetized in fragmented MFU units will be described below as specific example 1 of the second exemplary embodiment. FIGS. 13, 14 and 15 are views for explaining an example where encoded data is packetized in fragmented MFU units. In addition, in FIGS. 13, 14 and 15, white AUs indicate AUs of the base layer, and hatched AUs indicate AUs of the enhancement layer (the same also applies to following FIGS. 16 to 18).

When each fragmented MFU is packetized, a same packet ID is allocated to a packet ID of an MMT packet header, and a layer level ID is allocated to the MMT packet header. Further, among 'ftyp', 'moov' and 'moof', an ID indicating common data (common information) is allocated to the MMT packet header of the common data which is irrelevant to a layer level. FIG. 13 illustrates layer level A: the base layer, layer level B: the enhancement layer and layer level Z: the common information. In this regard, a layer level which has common information of the base layer may be the same.

In the case of such a configuration, encoded data of layer level B is handled as one asset. Receiving device 20*a* can filter a layer level after filtering based on a packet ID is performed.

When receiving device 20*a* needs to decode both of encoded data of the base layer and encoded data of the enhancement layer, receiving device 20*a* extracts all layer level IDs by performing filtering based on the layer level IDs after filtering based on packet IDs is performed. That is, upon layer level filtering, all of layer level A: the base layer, layer level B: the enhancement layer and layer level Z: the common information are extracted. Items of extracted data are as illustrated in FIG. 14.

When receiving device 20*a* needs to decode only encoded data of the base layer, receiving device 20*a* extracts layer level A: the base layer and layer level Z: the common information by performing filtering after filtering based on packet IDs is performed. Items of extracted data are as illustrated in FIG. 15 (*a*).

In this case, the AUs of the enhancement layer are removed, so that decoder 25 obtains aligned AUs of the base layer as illustrated in FIG. 15(*b*). However, time offset information and a data size of samples (AUs) described in 'moof' are pieces of information generated in a state where the enhancement layer is included. Hence, information described in a header does not match with actual data.

Hence, it is necessary to store information which is necessary to reconstruct MP4 data by, for example, additionally storing a size of the removed AUs and offset information.

Hence, when obtaining the AUs of the base layer or a DTS and a PTS, decoder 25 may perform decoding processing by taking into account that there is no AU of the enhancement layer (removed by filtering) in 'mdat' in header information such as 'moof'.

For example, offset information of each access unit (sample) in 'moof' is set assuming that there are the AUs of the enhancement layer. Hence, when obtaining only the base layer, decoder 25 subtracts a size of the removed AUs from the offset information. Data resulting from the subtraction is schematically as illustrated in FIG. 15(*c*).

Similarly, the DTS and the PTS are calculated based on sample_duration (a difference between DTSs of continuous access units) corresponding to the removed AUs of the enhancement layer, and sample_composition_time_offset (a difference between a DTS and a PTS of each access unit).

In addition, instead of performing the above subtraction, header information (header information of AUs of only the base layer) for decoding data obtained by extracting only the base layer may be described in an MP4 header in advance. Further, in an MP4 header, information used to identify header information in case where only the base layer is decoded, and header information in a case where both of the base layer and the enhancement layer are decoded may be described.

Specific Example 2

An example where MPU units are packetized without fragmenting each MPU will be described below as specific example 2 of the second exemplary embodiment.

Figure 16:
FIG. 16 is a view illustrating an example where items of encoded data are arranged directly in order in MP4 data.

First, an example where items of encoded data are arranged directly in order in MP4 data will be described. FIG. 16 is a view illustrating an example where the items of encoded data are arranged directly in order in the MP4 data (AUs of different layer levels are simultaneously multiplexed).

When items of encoded data are arranged directly in MP4 data, there are AUs of the base layer and AUs of the enhancement layer in one track in a 'mdat' box. In this case, each layer level ID is allocated to each AU. A layer level ID of each AU (sample) is described in 'moov' or 'moof'. In addition, the AUs of the base layer and the AUs of the enhancement layer which have the association relationship are desirably arranged in the same 'mdat' box. In addition, when a transport header is allocated to MP4 data to packetize, the same packet ID is allocated.

According to the above configuration, a layer level ID cannot be allocated to a packet header, and therefore it is not possible to perform filtering in packet units. It is possible to perform filtering by analyzing MP4 data.

In addition, there is another method, too, for classifying the base layer and the enhancement layer of encoded data into tracks, and describing an association relationship in a header.

Receiving device 20*a* performs packet filtering on data packetized in this way, then determines a layer level of each AU upon analysis of MP4 data, and extracts and decodes each AU of a desired layer.

Figure 17:
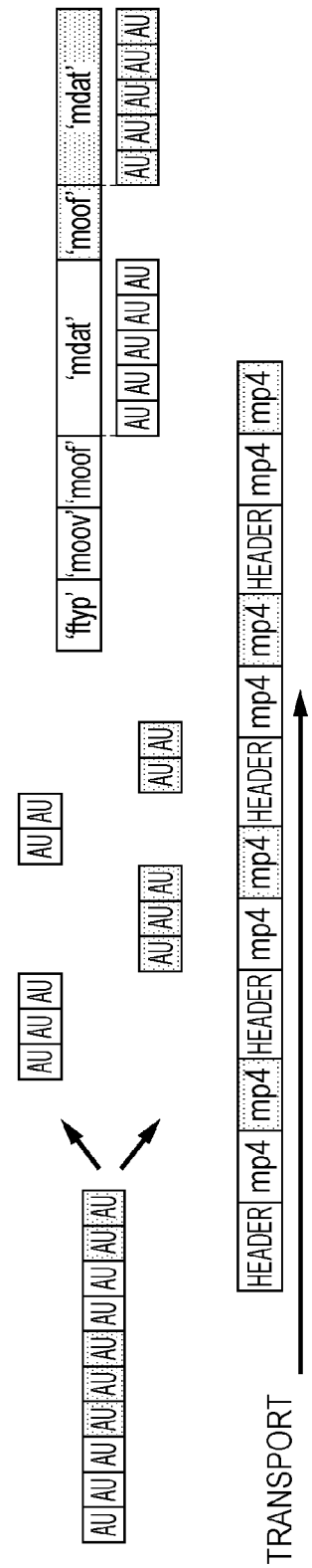
FIG. 17 is a view illustrating a first example where items of encoded data are arranged per layer level in MP4 data.

Next, a first example where items of encoded data are arranged per layer level in MP4 data will be described. FIG. 17 is a view illustrating the first example where the items of encoded data are arranged per layer level in MP4 data.

When items of encoded data are arranged per layer level in MP4 data, the items of encoded data are separated per layer level, and are arranged in the 'mdat' box which is a fragment per layer level. In this case, each layer level ID is described in 'moof'. A layer level ID indicating common information irrespectively of layers is allocated to a common header.

Further, the same packet ID is allocated to a packet header. In this case, too, filtering cannot be performed in packet units.

Receiving device 20*a* performs packet filtering on data packetized in this way, then determines a layer level of a fragment upon analysis of MP4 data, and extracts and decodes fragments of a desired layer.

Figure 18:
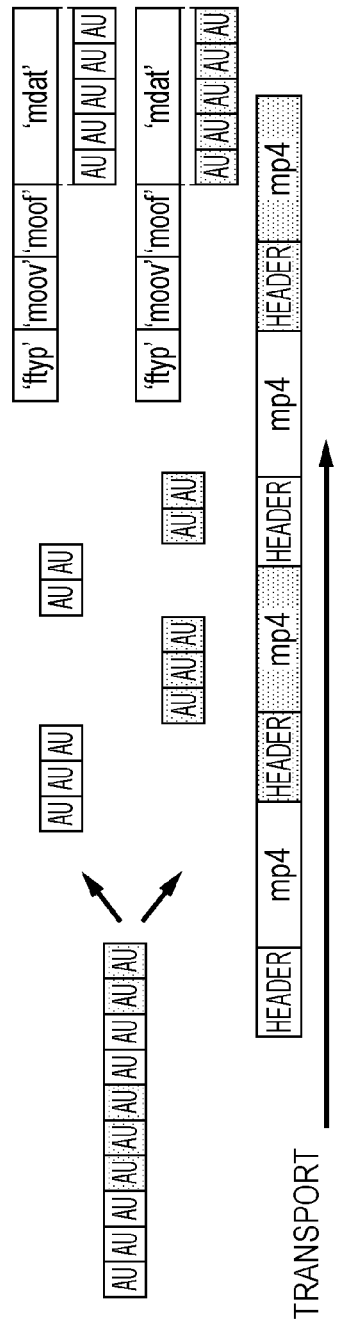
FIG. 18 is a view illustrating a second example where items of encoded data are arranged per layer level in MP4 data.

Finally, a second example where items of encoded data are arranged per layer level in MP4 data will be described. FIG. 18 is a view illustrating the second example where the items of encoded data are arranged per layer level in MP4 data.

In this example, the items of encoded data are separated per layer level, and are arranged in the 'mdat' box per layer level.

MP4 data in which the AUs of the base layer are stored and MP4 data in which the AUs of the enhancement layer are stored are generated.

The layer level ID is described in one or both of a header of MP4 data and a transport packet header. In this regard, the layer level ID indicates a layer relationship between items of MP4 data or between transport packets. In addition, the same packet ID is allocated to a packet header.

Receiving device 20*a* performs packet filtering on data packetized in this way, and extracts and decodes packets of a desired layer based on the layer level ID of the packet header.

Modified Example

That a packet ID and a layer level are separately allocated has been described in the above second exemplary embodiment. However, a layer level ID may be allocated by using partial bits of the packet ID or bits may be newly allocated as an extended packet ID. In addition, allocating a layer level ID by using partial bits of a packet ID is equivalent to allocating a different packet ID per layer level based on a rule that the same ID is allocated except for bits indicating a layer level ID.

Further, the above second exemplary embodiment has described that, when both of encoded data of the base layer and encoded data of the enhancement layer are decoded, the items of data of the base layer+the enhancement layer are extracted by packet filtering or layer level filtering. However, encoded data may be classified into the base layer and the enhancement layer once by layer level filtering, and may be reconstructed.

OTHER EXEMPLARY EMBODIMENTS

However, the present disclosure is not limited to these exemplary embodiments.

In the first and second exemplary embodiments, each encoded stream multiplexed according to MMT has been described. However, the encoded stream may be multiplexed according to another multiplexing method such as MPEG2-TS or an RTP (Real Transport Protocol). Further, a configuration where each MMT packet is transmitted according to MPEG-TS2 may be employed. In both cases, the reception side can easily select encoded data.

In the first and second exemplary embodiments, one encoded stream includes encoded data of the base layer and encoded data of the enhancement layer. However, a first encoded stream including encoded data of the base layer and a second encoded stream including encoded data of the enhancement layer may be separately generated. In this regard, the first encoded stream more specifically is an encoded stream which includes a packet obtained by packetizing the encoded data of the base layer and does not include a packet obtained by packetizing encoded data of the enhancement layer. The second encoded stream is an encoded stream which includes a packet obtained by packetizing the encoded data of the enhancement layer and does not include a packet obtained by packetizing encoded data of the base layer.

In this case, the first encoded stream and the second encoded stream may be generated according to different multiplexing methods. For example, one of the first encoded stream and the second encoded stream may be generated according to MPEG2-TS, and the other one of the first encoded stream and the second encoded stream may be generated according to MMT.

When the two encoded streams are generated according to the different multiplexing methods, packet IDs or layer level IDs are allocated according to respective multiplexing methods. Further, in this case, an association relationship with a layer level of a packet ID of each encoded stream or an association relationship with a layer level of a layer level ID is described in common program information. More specifically, only one of the two encoded streams includes the common program information or both of the two encoded streams include the common program information.

The receiving device performs packet filtering and layer level filtering based on the association relationship described in program information, and extracts and decodes encoded data of a desired layer level. That is, one video image is displayed from the two encoded streams.

Further, the first encoded stream and the second encoded stream may be transmitted by using (physically) different channels. More specifically, for example, one of the first encoded stream and the second encoded stream may be transmitted by using a channel for broadcasting, and the other one of the first encoded stream and the second encoded stream may be transmitted by using a channel for communication. Such transmission assumes, for example, hierarchical transmission or bulk transmission for transmitting data across channels. In this case, an association relationship between respective packet IDs or respective layer level IDs is described in common program information. In addition, program information may not be common information. The receiving device only needs to recognize an association relationship with a layer level of a packet ID, or an association relationship with a layer level of a layer level ID.

In addition, in the first and second exemplary embodiments, an encoded stream including two layers of one base layer and one enhancement layer has been described. However, multiple enhancement layers may be formed to configure an encoded stream of three or more layer levels. In this case, packet IDs (or different layer level IDs) are allocated to three layer levels, respectively.

In addition, in the first and secondary exemplary embodiments, transmitting device 15 includes encoder 16. However, a transmitting device may not include an encoding function. In this case, an encoder device which includes an encoding function is provided separately from transmitting device 15.

Similarly, in the first and second exemplary embodiments, receiving devices 20 and 20a include decoder 25. However, receiving devices 20 and 20a may not include a decoding function. In this case, a decoding device which includes a decoding function is provided separately from receiving devices 20 and 20a.

In addition, in the above first and second exemplary embodiments, each component may be realized by being configured by dedicated hardware or executing a software program suitable to each component. Each component may be realized by causing a program executing unit such as a CPU or a processor to read and execute a software program recorded in a recording medium such as a hard disk or a semiconductor memory.

Further, in the above first exemplary embodiment, another processor may execute processing executed by a specific processor. Furthermore, an order of a plurality of processings may be changed, or a plurality of processings may be executed in parallel.

In addition, comprehensive or specific aspects of the present disclosure may be realized by a system, a method, an integrated circuit, a computer program or a recording medium such as a computer-readable CD-ROM. Further, comprehensive or specific aspects of the present disclosure may be realized by an arbitrary combination of the system, the method, the integrated circuit, the computer program and the recording medium.

In addition, the present disclosure is not limited to these exemplary embodiments or modified examples of these exemplary embodiments. Aspects obtained by variously modifying the exemplary embodiments and modified examples of the exemplary embodiments by one of ordinary skill in the art or aspects by combining components of different exemplary embodiments and modified examples of the different exemplary embodiments may also be included in a range of the present disclosure without departing from the spirit of the present disclosure.

A first transmitting device according to one aspect of the present disclosure transmits data subjected to temporal scalable coding. In this regard, the data subjected to temporal scalable coding includes data of the base layer which is decodable data by using data included in a layer, and data of the enhancement layer which is not be independently decodable data and needs to be decoded together with the data of the base layer. In this regard, the data of the base layer is, for example, data used to decode a video image at 60 p, and the data of the enhancement layer is, for example, data used to decode a video image at 120 p by using the data of the base layer together.

The data of the base layer is transmitted as a first asset to which a first packet ID has been allocated, and the data of the enhancement layer is transmitted as a second asset to which a second packet ID has been allocated. The packet ID is described in a header of a packet in which data is stored. The transmitting device multiplexes and transmits the data of the base layer, the data of the enhancement layer and program information. In this regard, program information may include an identifier which indicates a layer relationship between packet IDs (or each asset corresponding to each packet). In this regard, the information indicating the layer relationship includes, for example, information indicating that the data of the first packet ID (first asset) is independently decodable data, and information indicating that the data of the second packet ID (second asset) is not be independently decodable data and needs to be decoded by using the data of the first packet ID (first asset).

Further, program information may include at least one of information indicating that each stream which configures a program is a scalable-coded stream (a stream including both of the base layer and the enhancement layer), information indicating a type of scalable coding, information indicating a number of layers and information related to a layer level.

Furthermore, a first receiving device according to one aspect of the present disclosure receives data subjected to temporal scalable coding. In this regard, the data subjected to temporal scalable coding includes data of the base layer which is decodable data by using data included in a layer, and data of the enhancement layer which is not independently decodable data and needs to be decoded together with the data of the base layer. In this regard, the data of the base layer is, for example, data used to decode a video image at 60 p, and the data of the enhancement layer is, for example, data used to decode a video image at 120 p by using the data of the base layer together.

The data of the base layer is transmitted as a first asset to which a first packet ID has been allocated, and the data of the enhancement layer is transmitted as a second asset to which a second packet ID has been allocated. The packet ID is described in a header of a packet in which data is stored. The transmitting device multiplexes and transmits the data of the base layer, the data of the enhancement layer and program information. In this regard, program information may include an identifier which indicates a layer relationship between packet IDs (or each asset corresponding to each packet). In this regard, the information indicating the layer relationship includes, for example, information indicating that the data of the first packet ID (first asset) is independently decodable data, and information indicating that the data of the second packet ID (second asset) is not independently decodable data and needs to be decoded by using the data of the first packet ID (first asset).

Further, program information may include at least one of information indicating that each stream which configures a program is a scalable-coded stream (a stream including both of the base layer and the enhancement layer), information indicating a type of scalable coding, information indicating a number of layers and information related to a layer level.

According to the above-described first transmitting device and second receiving device, the reception side can obtain from program information a packet ID (asset) which is necessary to decode data of a packet ID (asset), and perform filtering based on the packet ID (asset). When, for example, the first asset to which the first packet ID has been allocated is reproduced, it is possible to independently decode data of the first packet ID (first asset) and, consequently, data of the first packet ID (first asset) is obtained by filtering. Meanwhile, when the second asset to which the second packet ID has been allocated is reproduced, data of the second packet ID (second asset) is not independently decodable data and needs to be decoded by using the data of the first packet ID (first asset). Therefore, the data of the first packet ID (first asset) and the data of the second packet ID (second asset) are obtained by filtering.

In addition, according to the above configuration, information which is necessary to decode data of each packet ID (asset) and indicates data of a packet ID (asset) other than the packet ID (asset) is described in program information. According to this configuration, when, for example, scalable-coded data includes three layers of layer A, layer B which is decoded together with layer A and layer C which is decoded together with layer A, and when the receiving device selects a layer to reproduce, it is possible to specify a packet ID (asset) for transmitting data which is necessary to decode the data without performing complex determination.

Particularly when it is taken into account that a depth of a layer is 3 or more or that data encoded by scalable-coding of a plurality of types is multiplexed and transmitted in future, the configuration of being capable of specifying a packet ID (asset) for transmitting data which is necessary to decode data without performing complex determination is useful.

The encoded data transmitting method according to the present disclosure which allows a reception side to easily select encoded data which is hierarchically encoded is applicable to TV broadcast or moving image distribution.

What is claimed is:

1. A transmitting method for transmitting encoded data items obtained by chronologically and hierarchically encoding a video image, the encoded data items being encoded in an encoding order and to be displayed in a display order different from the encoding order, the transmitting method comprising:
   generating a plurality of first packets and a second packet, the plurality of first packets being obtained by packetizing the encoded data items differently according to whether a layer level of a corresponding one of the encoded data items is a base layer level or an enhancement layer level, the plurality of first packets each being allocated with a packet ID, each of the packet IDs being a numeral,
   the second packet including information indicating an association relationship between assets and the packet IDs; and
   transmitting an encoded stream and the second packet, the encoded stream including the plurality of first packets,
   wherein the numerical value of a packet ID allocated to each of one or more first packets corresponding to the base layer level is identical to the numerical value of a packet ID allocated to each of one or more first packets corresponding to the enhancement layer level.

2. The transmitting method according to claim 1, wherein an encoded data item of the base layer level is independently decodable or is decodable with reference to a decoded data item of another encoded data item of the base layer level among the encoded data items, and
   an encoded data item of the enhancement layer level is decodable with reference to a decoded data item of an encoded data item of the base layer level among the encoded data items.

3. The transmitting method according to claim 2, wherein in the generating, the encoded stream includes a first encoded stream and a second encoded stream,
   the first encoded stream includes the one or more first packets corresponding to the base layer level and not including the one or more first packets corresponding to the enhancement layer level,
   the second encoded stream includes the one or more first packets corresponding to the enhancement layer level and not including one or more first packets corresponding to the base layer level, and
   the transmitting includes transmitting the first encoded stream via a first channel, and transmitting the second encoded stream via a second channel different from the first channel.

4. The transmitting method according to claim 3, wherein the generating includes generating the first encoded stream and the second encoded stream according to different multiplexing methods.

5. The transmitting method according to claim 4, wherein the generating includes:
   generating one of the first encoded stream and the second encoded stream according to MPEG-2 TS (Moving Picture Experts Group-2 Transport Stream); and generating the other one of the first encoded stream and the second encoded stream according to MMT (MPEG Media Transport).

6. A transmitting method, performed by a transmission device, comprising:
- obtaining pictures generated by hierarchy encoding a video, the pictures including first pictures and second pictures belonging to a basic layer and an extended layer, respectively, decode order of the pictures being different from display order of the pictures;
- encapsulating the first pictures and the second pictures in first packets and second packets, respectively;
- associating a first packet identifier and a second packet identifier with the first packets and the second packets, respectively;
- generating a third packet to include information indicating the association of the first packet identifier and the second packet identifier with the first packets and the second packets;
- associating a third packet identifier with the third packet; and
- transmitting the first packets, the second packets, and the third packet,
- wherein the first packet identifier, the second packet identifier, and the third packet identifier are included in packet identifiers to identify respective assets, each of the first packet identifier, the second packet identifier, and the third packet identifier being a numeral, and
- the numerical value of the first packet identifier is identical to the numerical value of the second packet identifier.

7. The transmitting method according to claim 6, wherein
- the assets correspond to respective data entities, and
- the data entities each have same transport characteristics.

8. The transmitting method according to claim 6, wherein the packet identifiers include a fourth packet identifier to identify an audio data entity included in the assets.

9. A receiving method, performed by a reception device, comprising:
- receiving packets;
- reading packet identifiers of the packets to identify a third packet among the packets, the third packet being associated with a third packet identifier;
- reading information included in the third packet, the information indicating association of a first packet identifier and a second packet identifier with first packets and second packets; and
- extracting first pictures and second pictures from the first packets and the second packets, respectively, the first pictures and the second pictures being included in pictures generated by hierarchy encoding a video, the first pictures and the second pictures belonging to a basic layer and an extended layer, respectively, wherein
- decoding order of the pictures is different from display order of the pictures,
- the first packet identifier, the second packet identifier, and the third packet identifier are included in packet identifiers to identify respective assets, each of the first packet identifier, the second packet identifier, and the third packet identifier being a numeral, and
- the numerical value of the first packet identifier is identical to the numerical value of the second packet identifier.

* * * * *